(12) United States Patent
Blose et al.

(10) Patent No.: US 7,869,658 B2
(45) Date of Patent: Jan. 11, 2011

(54) REPRESENTATIVE IMAGE SELECTION BASED ON HIERARCHICAL CLUSTERING

(75) Inventors: Andrew C. Blose, Penfield, NY (US); Alexander C. Loui, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 994 days.

(21) Appl. No.: 11/677,617

(22) Filed: Feb. 22, 2007

(65) Prior Publication Data

US 2008/0205772 A1    Aug. 28, 2008

Related U.S. Application Data

(60) Provisional application No. 60/828,493, filed on Oct. 6, 2006, provisional application No. 60/828,494, filed on Oct. 6, 2006.

(51) Int. Cl.
G06K 9/62    (2006.01)

(52) U.S. Cl. .................. 382/224; 382/225; 382/228

(58) Field of Classification Search .................. 382/224, 382/225, 228
See application file for complete search history.

(56) References Cited

U.S. PATENT DOCUMENTS

| | | |
|---|---|---|
| 6,282,317 B1 | 8/2001 | Luo et al. |
| 6,351,556 B1 | 2/2002 | Loui et al. |
| 6,360,234 B2 | 3/2002 | Jain et al. |
| 6,463,444 B1 | 10/2002 | Jain et al. |
| 6,549,643 B1 | 4/2003 | Toklu et al. |
| 6,567,980 B1 | 5/2003 | Jain et al. |
| 6,606,411 B1 | 8/2003 | Loui et al. |
| 6,654,506 B1 | 11/2003 | Luo et al. |
| 6,661,907 B2 | 12/2003 | Ho et al. |
| 6,697,502 B2 | 2/2004 | Luo |
| 6,721,454 B1 | 4/2004 | Qian et al. |
| 6,738,100 B2 | 5/2004 | Hampapur et al. |
| 6,807,306 B1 | 10/2004 | Girgensohn et al. |
| 6,833,865 B1 | 12/2004 | Fuller et al. |
| 6,847,733 B2 * | 1/2005 | Savakis et al. .............. 382/225 |
| 6,877,134 B1 | 4/2005 | Fuller et al. |
| 6,915,011 B2 | 7/2005 | Loui et al. |
| 7,035,456 B2 | 4/2006 | Lestideau |
| 7,062,085 B2 | 6/2006 | Luo et al. |
| 7,162,102 B2 | 1/2007 | Cahill et al. |
| 2003/0048950 A1 | 3/2003 | Savakis et al. |
| 2003/0128389 A1 | 7/2003 | Matraszek et al. |

(Continued)

Primary Examiner—Samir A. Ahmed
Assistant Examiner—Fred Hu
(74) Attorney, Agent, or Firm—Robert L. Walker; Raymond L. Owens (57) ABSTRACT

In a computer-mediated method for providing representative images, image records are classified spatio-temporally into groups. In each group, image records are partitioned into clusters and the hierarchically highest cluster is ascertained. The partitioning is between a hierarchy of feature clusters and a remainder cluster, based on a predetermined plurality of saliency features. Feature clusters each have one or more of the saliency features. The remainder cluster lacks the saliency features. Feature clusters are each exclusive of the saliency features of any higher clusters in the hierarchy and non-exclusive of the saliency features of any lower feature clusters in the hierarchy. A representative image of each group is designated from respective image records based on: the respective saliency feature of the highest cluster when the highest cluster is a feature cluster and independent of the saliency features when the highest cluster is the remainder cluster.

10 Claims, 6 Drawing Sheets

U.S. PATENT DOCUMENTS

| | | |
|---|---|---|
| 2003/0210808 A1 | 11/2003 | Chen et al. |
| 2004/0179719 A1 | 9/2004 | Chen et al. |
| 2005/0033758 A1 | 2/2005 | Baxter |
| 2005/0271352 A1 | 12/2005 | Yokouchi |
| 2006/0104520 A1 | 5/2006 | Kraus et al. |
| 2006/0126944 A1 | 6/2006 | Loui et al. |
| 2006/0139461 A1* | 6/2006 | Matsui et al. ............ 348/231.2 |
| 2008/0037878 A1* | 2/2008 | Katta ........................ 382/224 |

* cited by examiner

REPRESENTATIVE IMAGE SELECTION BASED ON HIERARCHICAL CLUSTERING

CROSS REFERENCE TO RELATED APPLICATIONS

Reference is made to commonly assigned, U.S. patent application Ser. No. 60/828,493, entitled: DIFFERENTIAL CLUSTER RANKING FOR IMAGE RECORD ACCESS, filed Oct. 6, 2006, in the names of Cathleen D. Cerosaletti, John R. Fredlund, Alexander C. Loui, Sharon Field; Ser. No. 60/828,494, entitled: SUPPLYING DIGITAL IMAGES FROM A COLLECTION, filed Oct. 6, 2006, in the names of Cathleen D. Cerosaletti, John R. Fredlund, Samuel M. Fryer, Bryan D. Kraus, Alexander C. Loui, Annette L. Moore

FIELD OF THE INVENTION

The invention relates to digital image organization and management and more particularly relates to representative image selection hierarchical clustering.

BACKGROUND OF THE INVENTION

Digital photographers capture digital content with digital still cameras, video cameras, camera phones, and other random access digital capture devices. The captured content is initially stored on the capture device and, commonly, is then moved to personal computer disk memory or online storage systems. Whether the images are stored on the device or on larger computer systems, the photographer can either manually or automatically organize their images in a hierarchical fashion into digital content containers (typically called albums or folders). These containers can contain images and other image containers creating a hierarchical storage scheme. Organizing digital content by the real-life events, such as birthdays, holiday parties, and the like, is one of the most common organization methods used by digital photographers.

When searching and browsing hierarchical digital content collections, digital capture devices, personal computer file systems, image organization applications, and online storage systems typically represent a collection of digital content with an icon and/or a small-scaled image from the collection usually called a "thumbnail". The thumbnail image gives the user a view of one image from a potentially large collection of images to assist them in recognizing the event and content of the collection and is advantageous for this purpose over an icon and collection name. The specific image selected from the collection to represent the collection is sometimes referred to as a "key" image. The same approach is utilized to provide representative images, also referred to as "key frames", of video sequences.

The term "image record" is used herein to refer to a digital still image, video sequence, or multimedia record. An image record is inclusive of one or more digital images and can also include metadata, such as sounds or textual annotations. A particular image record can be a single digital file or multiple, but associated digital files. Metadata can be stored in the same image file as the associated digital image or can be stored separately. Examples of image records include multiple spectrum images, scannerless range images, digital album pages, and multimedia video presentations. With a video sequence, the sequence of images is a single image record. Each of the images in a sequence can alternatively be treated as a separate image record. Discussion herein is generally directed to image records that are captured using a digital camera. Image records can also be captured using other capture devices and by using photographic film or other means and then digitizing. As discussed herein, image records are stored digitally along with associated information.

Consumers tend to capture image records episodically, reflecting different occurrences. Grouping image records to reflect different episodes can be based on spatio-temporal differences, such as time or distance, or, in a more sophisticated manner, based upon event and subevent. These approaches tends to be convenient for many people, but have the shortcoming that the subject matter of the image records in groups and subgroups is not necessarily apparent from the grouping procedure. A representative image can make the subject matter of a group or subgroup apparent, but is relatively difficult to determine. This is unlike groupings, in which all members necessarily have the same subject matter, such that a member of a group is representative of the group. For example, any member of the group "pictures of the new baby" would be capable of representing the group as a picture of the new baby.

Many systems use the first image record in a set of image records as the representative image record. The first image record is typically chronologically the earliest. The selection of the first image record often does not adequately reflect the context or content of the other image records in the set. For example, many digital photographers capture content before an actual event begins simply to verify camera operation. The content captured for this purpose is arbitrary and may or may not reflect the content captured during the actual event. Actual event content captured at the beginning of a lengthy event also frequently does not accurately reflect the context and setting of the entire event.

U.S. Pat. No. 6,847,733 to Savakis et al. discloses a method, in which images are grouped and representative images of the groups are determined based upon an understanding of the content (semantic saliency features) in the images. U.S. Pat. No. 6,721,454 to Qian et al. discloses a method, in which video sequences are analyzed to determine semantic and other saliency features that are then summarized in textual descriptions. These approaches can be effective, but tend to be uniformly computationally intensive and complex.

It would thus be desirable to provide an improved method and system, which overcomes these shortcomings.

SUMMARY OF THE INVENTION

The invention is defined by the claims. The invention, in broader aspects, provides methods and systems, in which representative images in a collection of image records are provided. The image records each include one or more captured digital images. In the method, image records are classified spatio-temporally into groups. The image records of each of the groups are partitioned into a set of clusters. The partitioning is between a hierarchy of two or more feature clusters and a remainder cluster. The partitioning is based on a predetermined plurality of saliency features. The feature clusters each have one or more of the saliency features. The remainder cluster lacks the saliency features. The feature clusters are each exclusive of the saliency features of any higher clusters in the hierarchy and non-exclusive of the saliency features of any lower feature clusters in the hierarchy. The hierarchically highest cluster in each of the sets is ascertained to provide highest clusters. A representative image of each of the groups is designated from the respective image records. The designating is based on the respective saliency feature of the highest cluster when the highest cluster is a feature cluster and is independent of the saliency features when the highest cluster is the remainder cluster.

It is an advantageous effect of the invention that an improved method and system are provided, in which representative image records of groups of image records can be determined efficiently and with a level of complexity appropriate to the types of image records in the groups.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

In the method and system, image records are classified spatio-temporally into groups and representative images are determined for each of the groups based on a limited number of saliency features in the image records of the particular group. This approach is based on the determination that for the subject matter of picture taking sessions differs from session to session for many or most users, but, despite this, all of those pictures are combined in a common collection. For example, a user might take (or receive from others) only pictures of people from a holiday party, but might take mostly pictures of scenery on a vacation. The various pictures could all be analyzed for detailed semantic content and then a representative image could be determined based on the overall subject of a particular picture taking session, but this approach is very computationally intensive. The same thing applies to other types of image records, with the proviso that as the material to be analyzed increases, so does the computational burden. For convenience, the following discussion is generally limited to image records that are each an individual digital image. Like considerations apply to other types of image records. For example, procedures applicable to a single digital image can be repeated for each of the frames of a video.

The saliency features are objective characteristics of the images that are determinable from the data in the respective image, without human intervention. The saliency features include semantic saliency features and structural saliency features. The semantic saliency features represent the meanings of particular items of image information within the image that correspond to the meanings understood by a human observer to whom the image is presented for viewing. For example, a particular pattern of light and shadow in an image that is understood by a human being as being a pair of eyes can be represented by a semantic saliency feature indicating the presence of a pair of eyes in the image. Particular semantic saliency features can include further limitations, such as size, location, and the like. Semantic saliency features are sometimes referred to as high level features, in view of their relative complexity. The structural saliency features represent relatively low level computed information about the characteristics of an image that, unlike the semantic saliency features, do not correspond to information directly understandable by a human observer viewing the image. For example, the presence of particular subject matter in a scene can be readily identified by existing image processing and image understanding algorithms. Saliency features herein can be combinations of other saliency features. The inclusion of one semantic saliency feature in such a combination, renders the combination a semantic saliency feature. For example, U.S. Pat. No. 6,282,317, filed Dec. 31, 1998 by Luo et al., describes a method for automatic determination of the a combination semantic saliency feature of main subject, using semantic saliency features including: flesh, face, sky, and grass, together with structural saliency features related to color, texture, and brightness.

In the following description, some features are described as "software" or "software programs". Those skilled in the art will recognize that the equivalent of such software can also be readily constructed in hardware. Because image manipulation algorithms and systems are well known, the present description emphasizes algorithms and features forming part of, or cooperating more directly with, the method. General features of the types of computerized systems discussed herein are well known, and the present description is generally limited to those aspects directly related to the method of the invention. Other aspects of such algorithms and apparatus, and hardware and/or software for producing and otherwise processing the image signals involved therewith, not specifically shown or described herein may be selected from such systems, algorithms, components, and elements known in the art. Given the description as set forth herein, all additional software/hardware implementation is conventional and within the ordinary skill in the art.

Figure 2:
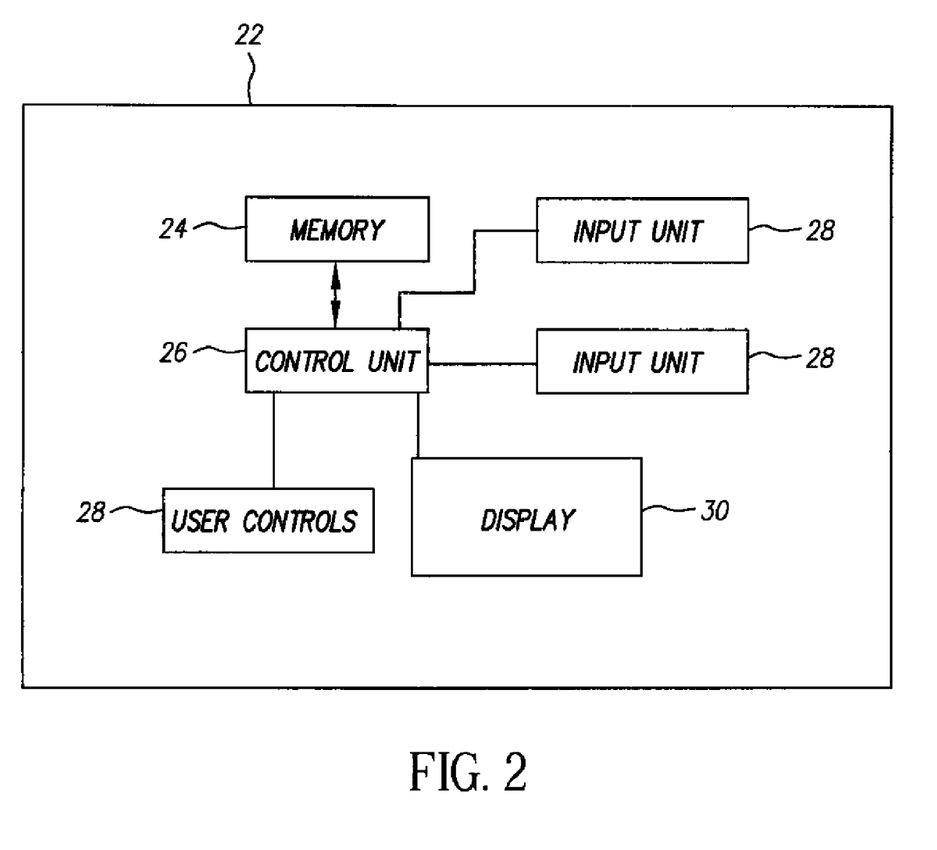
FIG. 2 is a diagrammatical view of an embodiment of the system.
Figure 3:
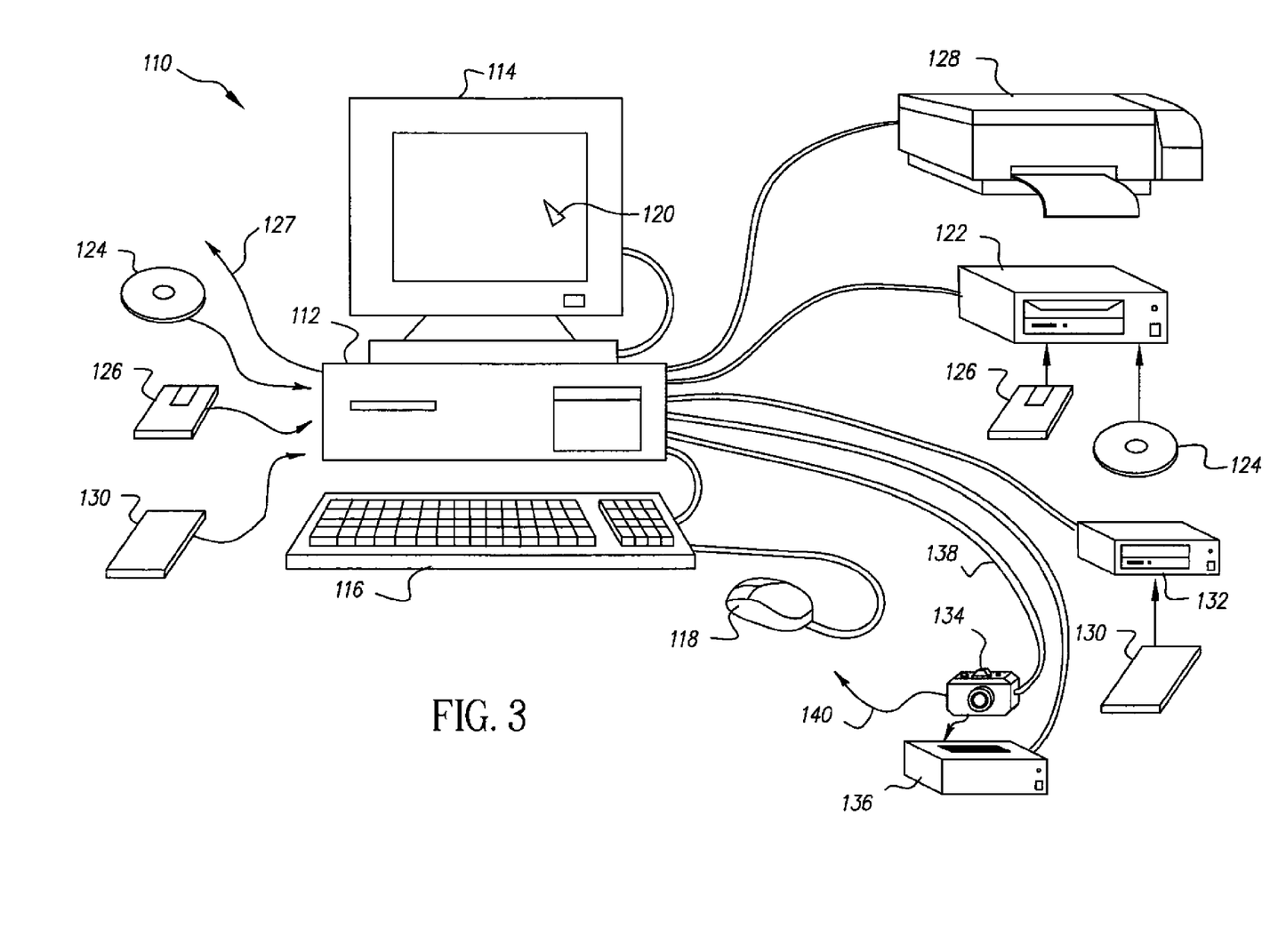
FIG. 3 is a diagrammatical view of another embodiment of the system.

FIG. 2 illustrates an embodiment of the system. The system has a housing 22, memory 24 having a collection of images, a processor 26, and input and output units 28,30 connected to the processor. The system has a user interface that includes some or all of the input and output units including user controls. One of the output units can be a display. Components are connected by signal paths and, in this embodiment, the system components and signal paths are located within the housing as illustrated. In other embodiments, one or more components and signal paths can be located in whole or in part outside of the housing. FIG. 3 illustrates another embodiment, in which the system includes a general purpose computer and various peripherals. Different components of the system can be completely separate or can share one or more hardware and/or software features with other components.

The processor operates the other components of the system utilizing stored software and data based upon signals from the input units. The processor can include, but is not limited to, a programmable digital computer, a programmable microprocessor, a programmable logic processor, a series of electronic circuits, a series of electronic circuits reduced to the form of an integrated circuit, or a series of discrete components.

In addition to functions necessary to operate the system, the processor can manipulates images according to software programs stored in memory either automatically or with user intervention. For example, a digital still image can be processed by the digital signal processor to provide interpolation and edge enhancement. Similarly, an image may need to be transformed to accommodate different output capabilities, such as gray scale, color gamut, and white point of a display. The displayed image can may be cropped, reduced in resolution and/or contrast levels, or some other part of the information in the image may not be shown. Modifications related to file transfer, can include operations such as, JPEG compression and file formatting. Other enhancements can also be provided. The image modifications can also include the addition or modification of metadata, that is, image associated non-image information.

"Memory" refers to one or more suitably sized logical units of physical memory provided in semiconductor memory or magnetic memory, or the like. Memory of the system can store a computer program product having a program stored in a computer readable storage medium. Memory can include conventional memory devices including solid state, magnetic, optical or other data storage devices and can be fixed within system or can be removable. For example, memory can be an internal memory, such as, such as SDRAM or Flash EPROM memory, or alternately a removable memory, or a combination of both. Removable memory can be of any type, such as a Compact Flash (CF) or Secure Digital (SD) type card inserted into a socket and connected to the processor via a memory interface. Other types of storage that are utilized include without limitation PC-Cards, MultiMedia Cards (MMC), or embedded and/or removable hard drives. In the embodiment of FIG. 3, system is shown having a hard drive, a disk drive for a removable disk such as an optical, magnetic or other disk memory (not shown) and a memory card slot that holds a removable memory, such as a removable memory card and has a removable memory interface for communicating with removable memory. Data including but not limited to control programs, digital images and other images, and metadata can also be stored in a remote memory system such as a personal computer, computer network or other digital system.

The input units can comprise any form of transducer or other device capable of receiving an input from a user and converting this input into a form that can be used by the processor. Similarly, the output units can comprise any form of device capable of delivering an output in human perceptible form or in computer readable form as a signal or as part of a computer program product. Input and output units can be local or remote. A wired or wireless communications system that incorporates hardware and software of one or more input and output units can be included in the system.

The input units of the user interface can take a variety of forms. For example, the user interface can comprise a touch screen input, a touch pad input, a 4-way switch, a 6-way switch, an 8-way switch, a stylus system, a trackball system, a joystick system, a voice recognition system, a gesture recognition system a keyboard, a remote control or other such systems. Input devices can include one or more sensors, which can include light sensors, biometric sensors, and other sensors known in the art that can be used to detect conditions in the environment of system and to convert this information into a form that can be used by processor of the system. Light sensors can include one or more ordinary cameras and/or multispectral sensors. Sensors can also include audio sensors that are adapted to capture sounds. Sensors can also include biometric or other sensors for measuring involuntary physical and mental reactions such sensors including but not limited to voice inflection, body movement, eye movement, pupil dilation, body temperature, and the p4000 wave sensors.

Output units can also vary widely. In a particular embodiment, the system includes a display, a printer, and a memory writer as output units. The printer can record images on receiver medium using a variety of known technologies including, but not limited to, conventional four color offset separation printing or other contact printing, silk screening, dry electrophotography such as is used in the NexPress 2100 printer sold by Eastman Kodak Company, Rochester, N.Y. USA, thermal printing technology, drop on demand ink jet technology and continuous inkjet technology. For the purpose of the following discussions, the printer will be described as being of a type that generates color images on a paper receiver; however, it will be appreciated that this is not necessary and that the claimed methods and apparatuses herein can be practiced with a printer that prints monotone images such as black and white, grayscale or sepia toned images and with a printer that prints on other types of receivers.

A communication system can comprise for example, one or more optical, radio frequency or other transducer circuits or other systems that convert image and other data into a form that can be conveyed to a remote device such as remote memory system or remote display device using an optical signal, radio frequency signal or other form of signal. The communication system can also be used to receive a digital image and other data from a host or server computer or network (not shown), a remote memory system or a remote input. The communication system provides processor 26 with information and instructions from signals received thereby. Typically, the communication system will be adapted to communicate with a remote memory system by way a communication network such as a conventional telecommunication or data transfer network such as the internet, a cellular, peer-to-peer or other form of mobile telecommunication network, a local communication network such as wired or wireless local area network or any other conventional wired or wireless data transfer system.

A source of image records can be provided in the system. The source of image records can include any form of electronic or other circuit or system that can supply the appropriate digital data to the processor. The source of image records can be a camera or other capture device that can capture content data for use in image records and/or can obtain image records that have been prepared by or using other devices. For example, a source of image records can comprise a set of docking stations, intermittently linked external digital capture and/or display devices, a connection to a wired telecommunication system, a cellular phone and/or a wireless broadband transceiver providing wireless connection to a wireless telecommunication network. As other examples, a cable link provides a connection to a cable communication network and a dish satellite system provides a connection to a satellite communication system. An Internet link provides a communication connection to a remote memory in a remote server. A disk player/writer provides access to content recorded on an optical disk.

The present invention can be implemented in computer hardware and computerized equipment. For example, the method can be performed using a system including one or more digital cameras or other capture devices and/or one or more personal computers. Referring to FIG. 3, there is illustrated a computer system 110 for implementing the present invention. (For convenience, numbering is different in FIGS. 2 and 3. It will be understood that like parts have like functions.) Although the computer system 110 is shown for the purpose of illustrating a preferred embodiment, the present invention is not limited to the computer system 110 shown, but may be used with any electronic processing system such as found in digital cameras, cellular camera phones and other mobile devices, home computers, kiosks, retail or wholesale photofinishing, or any other system for the processing of digital images. The computer system 110 includes a processor 112 (illustrated by a portable computer console in FIG. 3) for receiving and processing software programs and for performing other processing and control functions. A display 114 is electrically connected to the processor 112 for displaying user-related information associated with the software, e.g., by means of a graphical user interface. A keyboard 116 is also connected to the processor 112, permitting a user to input information to the software. As an alternative to using the keyboard 116 for input, a mouse 118 may be used for moving a selector 120 on the display 114 and for selecting an item on which the selector 120 overlays, as is well known in the art.

Removable memory, in any form, can be included and is illustrated as a compact disk-read only memory (CD-ROM) 124, which can include software programs, is inserted into the microprocessor based unit for providing a means of inputting the software programs and other information to the processor. Multiple types of removable memory can be provided (illustrated here by a floppy disk 126) and data can be written to any suitable type of removable memory. Memory can be external and accessible using a wired or wireless connection, either directly or via a local or large area network, such as the Internet. Still further, the processor 112 may be programmed, as is well known in the art, for storing the software program internally. A printer or other output device 128 can also be connected to the processor 112 for printing a hardcopy of the output from the computer system 110. The processor 112 can have a network connection 127, such as a telephone line or wireless link, to an external network, such as a local area network or the Internet.

Images may also be displayed on the display 114 via a memory card, which contains digitized images electronically embodied in the card 130. The card 130 is ultimately inserted into the processor 112 for permitting visual display of the image on the display 114. Alternatively, the card 130 can be inserted into an externally located card reader 132 connected to the processor 112. Images may also be input via the compact disk 124, the floppy disk 126, or the network connection 127. Any images stored in the card 130, the floppy disk 126, or the compact disk 124, or input through the network connection 127, may have been obtained from a variety of sources, such as a digital camera or a scanner. Images may also be input directly from a digital camera 134 via a camera docking port 136 connected to the processor 112 or directly from the digital camera 134 via a cable connection 138 to the processor 112 or via a wireless connection 140 to the processor 112.

The output device 128 provides a final image(s) that has been subject to transformations. The output device can be a printer or other output device that provides a paper or other hard copy final image. The output device can also be an output device that provides the final image(s) as a digital file. The output device can also include combinations of output, such as a printed image and a digital file on a memory unit, such as a CD or DVD which can be used in conjunction with any variety of home and portable viewing device such as a "personal media player" or "flat screen TV".

The processor 112 provides means for processing the digital images to produce pleasing looking images on the intended output device or media. The present invention can be used with a variety of output devices that can include, but are not limited to, a digital photographic printer and soft copy display. The processor 112 can be used to process digital images to make adjustments for overall brightness, tone scale, image structure, etc. of digital images in a manner such that a pleasing looking image is produced by an image output device. Those skilled in the art will recognize that the present invention is not limited to just these mentioned image processing functions.

In a particular embodiment (illustrated generically by FIG. 2), the system is a camera that has a body, which provides structural support and protection for other components. An electronic image capture unit, which is mounted in the body, has a taking lens and an electronic array image sensor aligned with the taking lens. In the capture unit, captured electronic images from the image sensor are amplified, converted from analog to digital, and processed to provide one or more image records.

The camera has a user interface, which provides outputs to the photographer and receives photographer inputs. The user interface includes one or more user input controls for user inputs and an image display. User input controls can include a shutter release, a "zoom in/out" control that controls the zooming of the lens units, and other user controls. User input controls can be provided in the form of a combination of buttons, rocker switches, joysticks, rotary dials, touch screens, microphones and processors employing voice recognition responsive to user initiated auditory commands, microphones and processors employing voice recognition responsive to user initiated auditory commands, and the like. The user interface can include user reaction tracking features, such as an image sensor, a galvanic response sensor, and the above-mentioned microphone. These features can store unanalyzed information for later analysis or a module capable of analyzing user responses and generating appropriate metadata can be included in the user interface. US Patent Publication No. 2003/0128389 A1, filed by Matraszek et al., discusses the generation of metadata from user reaction tracking.

The user interface can include one or more information displays to present camera information to the photographer, such as exposure level, exposures remaining, battery state, flash state, and the like. The image display can instead or additionally also be used to display non-image information, such as camera settings. For example, a graphical user interface (GUI) can be provided, including menus presenting option selections and review modes for examining captured images. Both the image display and a digital viewfinder display (not illustrated) can provide the same functions and one or the other can be eliminated. The camera can include a speaker and/or microphone (not shown), to receive audio inputs and provide audio outputs.

The camera assesses ambient lighting and/or other conditions and determines scene parameters, such as shutter speeds and diaphragm settings using the imager and/or other sensors. The image display produces a light image (also referred to here as a "display image") that is viewed by the user.

The processor controls or adjusts the exposure regulating elements and other camera components, facilitates transfer of images and other signals, and performs processing related to the images. The processor includes support features, such as a system controller, timing generator, analog signal processor, A/D converter, digital signal processor, and dedicated memory. As with the processors earlier discussed, the processor can be provided by a single physical device or by a larger number of separate components. For example, the processor can take the form of an appropriately configured microcomputer, such as an embedded microprocessor having RAM for data manipulation and general program execution. The timing generator supplies control signals for all electronic components in timing relationship. The components of the user interface are connected to the processor and function by means of executed software programs. The processor also operates the other components, including drivers and memories.

The camera can include other components to provide information supplemental to captured image information. An example of such a component is an orientation sensor. Other examples include a real time clock, a global positioning system receiver, and a keypad or other entry device for entry of user captions or other information.

The method and apparatus herein can include features provided by software and/or hardware components that utilize various data detection and reduction techniques, such as face detection, skin detection, people detection, other object detection, for interpreting the scene depicted on an image, for example, a birthday cake for birthday party pictures, or characterizing the image, such as in the case of medical images capturing specific body parts.

It will be understood that the circuits shown and described can be modified in a variety of ways well known to those of skill in the art. It will also be understood that the various features described here in terms of physical circuits can be alternatively provided as firmware or software functions or a combination of the two. Likewise, components illustrated as separate units herein may be conveniently combined or shared. Multiple components can be provided in distributed locations.

Image files may be subject to automated pattern classification. It will be understood that the invention is not limited in relation to specific technologies used for these purposes, except as specifically indicated. For example, pattern classification can be provided by any of the following, individually or in combination: rule based systems, semantic knowledge network approaches, frame-based knowledge systems, neural networks, fuzzy-logic based systems, genetic algorithm mechanisms, and heuristics-based systems.

A digital image includes one or more digital image channels or color components. Each digital image channel is a two-dimensional array of pixels. Each pixel value relates to the amount of light received by the imaging capture device corresponding to the physical region of pixel. For color imaging applications, a digital image will often consist of red, green, and blue digital image channels. Motion imaging applications can be thought of as a sequence of digital images. Those skilled in the art will recognize that the present invention can be applied to, but is not limited to, a digital image channel for any of the herein-mentioned applications. Although a digital image channel is described as a two dimensional array of pixel values arranged by rows and columns, those skilled in the art will recognize that the present invention can be applied to non-rectilinear arrays with equal effect.

It should also be noted that the present invention can be implemented in a combination of software and/or hardware and is not limited to devices, which are physically connected and/or located within the same physical location. One or more of the devices illustrated in FIGS. 2 and 3 can be located remotely and can be connected via a network. One or more of the devices can be connected wirelessly, such as by a radio-frequency link, either directly or via a network.

The present invention may be employed in a variety of user contexts and environments. Exemplary contexts and environments include, without limitation, wholesale imaging services, retail imaging services, use on desktop home and business computers, use on kiosks, use on mobile devices, and use as a service offered via a network, such as the Internet or a cellular communication network.

Portable display devices, such as DVD players, personal digital assistants (PDA's), cameras, and cell phones can have features necessary to practice the invention. Other features are well known to those of skill in the art. In the following, cameras are sometimes referred to as still cameras and video cameras. It will be understood that the respective terms are inclusive of both dedicated still and video cameras and of combination still/video cameras, as used for the respective still or video capture function. It will also be understood that the camera can include any of a wide variety of features not discussed in detail herein, such as, detachable and interchangeable lenses and multiple capture units. The camera can be portable or fixed in position and can provide one or more other functions related or unrelated to imaging. For example, the camera can be a cell phone camera or can provide communication functions in some other manner. Likewise, the system can take the form of a portable computer, an editing studio, a kiosk, or other non-portable apparatus.

In each context, the invention may stand alone or may be a component of a larger system solution. Furthermore, human interfaces, e.g., the scanning or input, the digital processing, the display to a user, the input of user requests or processing instructions (if needed), the output, can each be on the same or different devices and physical locations, and communication between the devices and locations can be via public or private network connections, or media based communication. Where consistent with the disclosure of the present invention, the method of the invention can be fully automatic, may have user input (be fully or partially manual), may have user or operator review to accept/reject the result, or may be assisted by metadata (metadata that may be user supplied, supplied by a measuring device (e.g. in a camera), or determined by an algorithm). Moreover, the algorithm(s) may interface with a variety of workflow user interface schemes.

Figure 1:
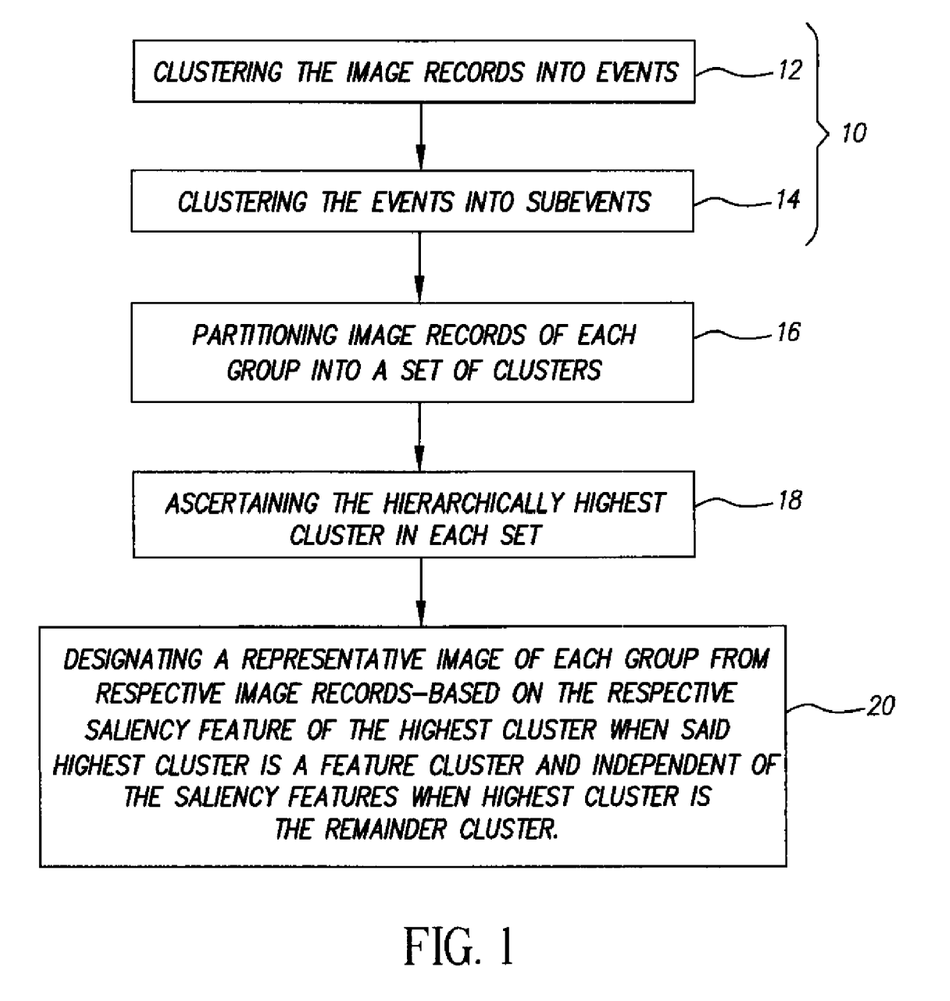
FIG. 1 is a flow chart of an embodiment of the method.

Referring to FIG. 1, in the method, image records are classified (10) spatio-temporally into groups. In a particular embodiment, the groups are subevents, which are produced by clustering (12) the images into events and then clustering (14) the events into subevents. The terms "event" and "subevent" are used in an objective sense to indicate the products of a computer mediated procedure that attempts to match a user's subjective perceptions of specific occurrences (corresponding to events) and divisions of those occurrences (corresponding to subevents). The images of each group are then partitioned (16) into a set of clusters. The partitioning (16) is between a hierarchy of two or more feature clusters and a remainder cluster, based on predetermined saliency features. The feature clusters each have one or more of the saliency features. The remainder cluster lacks any of the predetermined saliency features. In the hierarchy, the feature clusters are each exclusive of the saliency features of any higher clusters and non-exclusive of the saliency features of any lower feature clusters. For a given feature cluster, the saliency feature that defines the order of that cluster in the hierarchy is also referred to herein as the primary saliency feature of that cluster and any additional saliency features of the predetermined plurality that are also present are referred to herein as secondary saliency features.

The clusters of a particular group each have a different primary saliency feature. It is preferred that the number of possible clusters is four or greater to improve selection of respective representative images. For any particular group, the clusters actually produced by the clustering will depend upon the images of the particular group. As a maximum, an image group can have a feature cluster corresponding to each saliency feature and a remainder cluster. As a minimum, an image group can have a single cluster, which can be either one of the feature clusters or a remainder cluster.

After the groups are partitioned, the hierarchically highest cluster of each group is ascertained (18) and a representative image of the group is designated (20). If the highest cluster is a feature cluster, the representative image is based on the primary saliency feature of the highest cluster of the respective group. If the highest cluster of a group is the remainder cluster, the representative image is designated independent of the predetermined plurality of saliency features.

Figure 4:
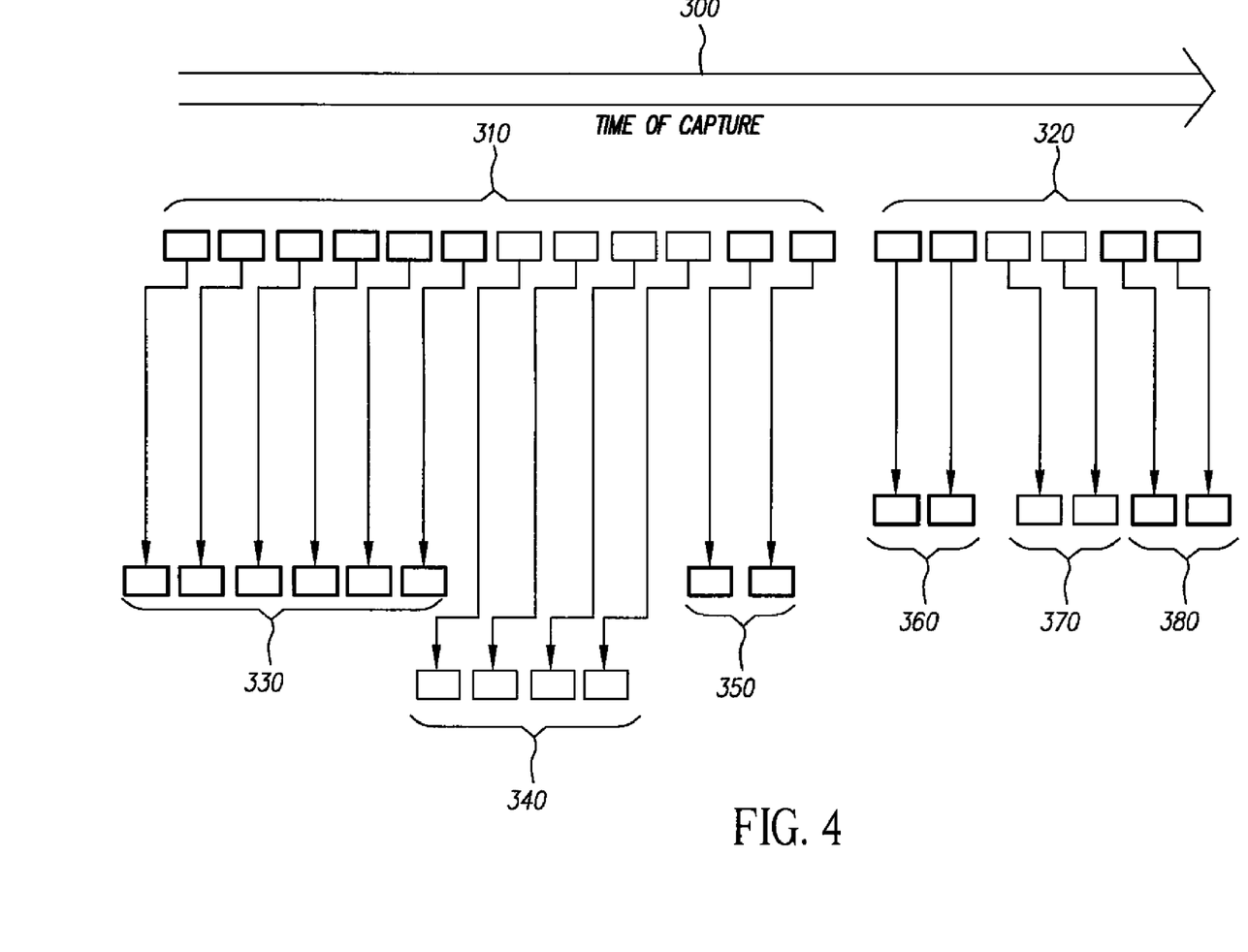
FIG. 4 is a diagram showing the grouping of a collection of images into events and subevents.

In a particular embodiment, the classifying is a clustering of the images into events and the events into subevents. The subevents are the image groups. Each event is grouped into subevents in step 14. FIG. 4 illustrates the grouping of a collection of images captured sequentially in time (indicated by arrow 300) and clustered into events 310, 320. Events 310 and 320 are subdivided into subevents 330, 340, 350 and 360, 370, 380, respectively. In a particular embodiment, the spatio-temporal classifying is by events and subevents using one of a variety of known event clustering techniques. U.S. Pat. No. 6,606,411, to A. Loui and E. Pavie, entitled "A method for automatically classifying images into events," issued Aug. 12, 2003 and U.S. Pat. No. 6,351,556, to A. Loui, and E. Pavie, entitled "A method for automatically comparing content of images for classification into events", issued Feb. 26, 2002, disclose algorithms for clustering image content by events and subevents. Other methods of automatically grouping images by event are disclosed in U.S. Patent Application Publication No. US2006/0204520 A1, published May 18, 2006, by B. Kraus and A. Loui, entitled "Multi-tiered image clustering by event" and U.S. Patent Application Publication No. US2006/0126944 A1, published Jun. 15, 2006, by A. Loui and B. Kraus, entitled "Variance-based event clustering". Another method of automatically organizing images into events is disclosed in U.S. Pat. No. 6,915,011, to A. Loui, M. Jeanson, and Z. Sun, entitled "Event clustering of images using foreground and background segmentation" issued Jul. 5, 2005. The selection of a particular spatio-temporal classification technique can be based on the advantages of the particular technique or on convenience of as determined heuristically for a collection of images.

Figure 5:
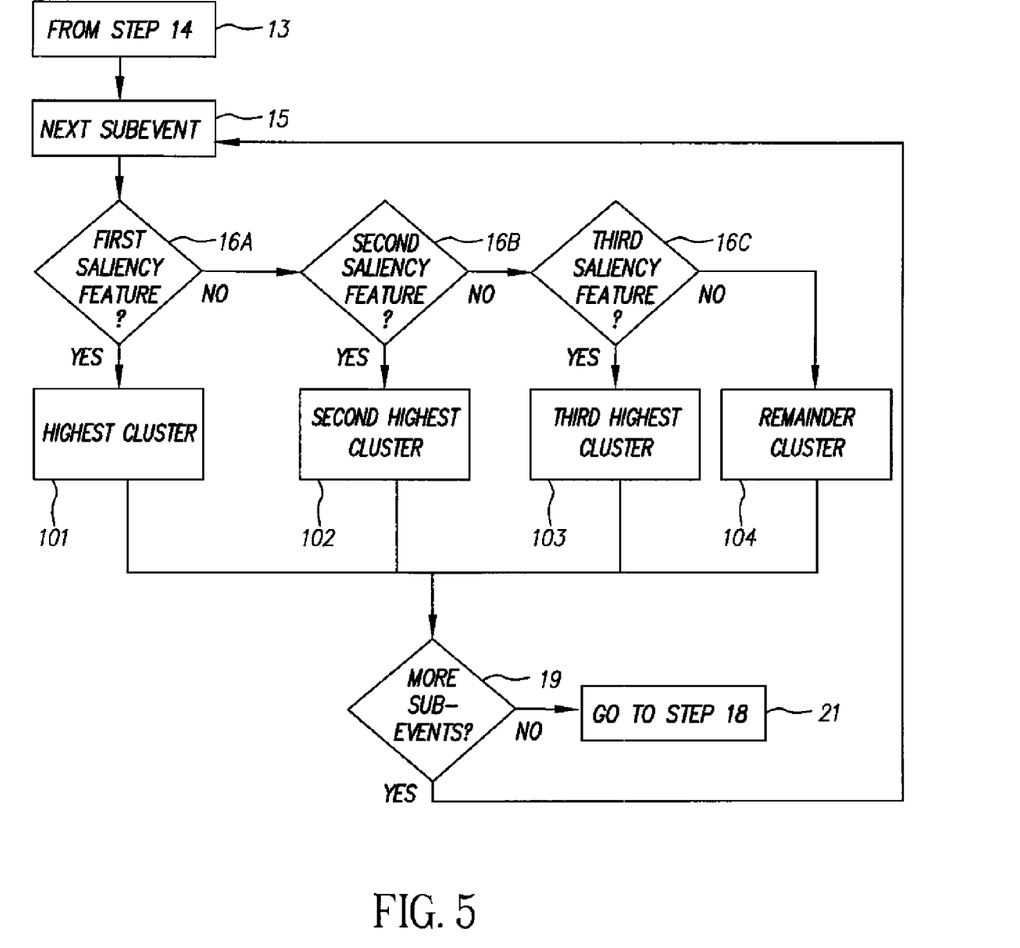
FIG. 5 is a detailed flow chart showing the partitioning step in the method of FIG. 1.

Referring to FIG. 5, in a particular embodiment, the partitioning is a repeated two-way clustering of the images of each group between a feature cluster and a non-feature cluster. The feature cluster generated by each clustering is based on a different saliency feature. The non-feature clusters lack the respective saliency feature. The subevents are received (13) from step (14) and then individually considered (15). The first clustering is performed on all of the images in the subevent and is based on a determination (16a) whether a first saliency feature is present in the images of the subevent. Any images having the first saliency feature are placed in the highest cluster 101 of the hierarchy. The next clustering is performed on the non-feature cluster of the first clustering and is based on a determination (16b) whether a second saliency feature is present in the remaining images of the subevent. Any of the remaining images having the second saliency feature are placed in the second highest cluster 102 of the hierarchy. The next clustering is performed on the non-feature cluster of the second clustering, is based on a determination (16c) whether a third saliency feature is present in the then remaining images of the subevent. Any of the remaining images having the third saliency feature are placed in the third highest cluster 103 of the hierarchy. The clustering can be repeated for additional saliency features, generating a hierarchy with additional clusters. The non-feature cluster of the final two-way clustering is the remainder cluster 104. The process is repeated (indicated in FIG. 5 by decision (19)) for additional subevents and goes (as indicated by box (21) to step 18 when completed.

The saliency features are selected so as to be meaningful to the user and are used so as to generate a hierarchy of clusters that correspond to how the user would organize the images. It has been determined that for many consumers, the following are important saliency features: presence of one or more people, presence of one or more faces, presence of a main subject, main subject colorfulness, main subject centrality, presence of duplicate images, and the amount of usage of an image, such as, the numbers of times an image was emailed, printed, or viewed.

In a particular embodiment, the different stages of the repeated two-way clustering are based on a face metric, then on a main subject metric, then on a duplicate images metric. This approach provides the advantage that the selection of a representative image is based on features that are likely to be important to the user, without having to consider all the semantic details of the images, such as identifying the subject matter of the main subjects. More specifically the first clustering can be based on the presence of one or more faces, the second clustering on the presence of a main subject, and the third clustering on the presence of duplicate images. At each clustering step, a determination is made as to whether the respective metric exceeds a respective predetermined threshold. In a modification of this embodiment, the faces are identified individuals from a predetermined list. This is advantageous in that consumers can adjust the selection of representative images based on personal preference and bias the selection based on specific individuals.

Methods of detecting human faces in images are known in the art and, for example, are disclosed in U.S. Patent Application Publication No. 2004/0179719 A1, by S. Chen, H. Nicponski, and L. Ray, entitled "Method and system for face detection in digital images", published Sep. 16, 2004, U.S. Pat. No. 7,035,456, issued to F. Lestideau, entitled "Face detection in color images with complex background" issued Apr. 25, 2006, and U.S. Pat. No. 6,661,907, to E. Ho and J. Lennon, entitled "Face detection in digital images", issued Dec. 9, 2003. Face detection provides the location and area of the image for each detected face in the image. Methods of detecting people are also known in the art, for example, as disclosed in U.S. Pat. No. 6,697,502, to J. Luo, entitled "Image processing method for detecting human figures in a digital image" issued Feb. 17, 2004.

In a particular embodiment, face recognition is performed and may be combined with or follow face detection. Face recognition techniques are used to generate an identity for each face. One method for automatic face recognition is to first use an active shape model-based facial feature points finder described in "An automatic facial feature finding system for portrait images", by Bolin and Chen in the Proceedings of IS&T PICS conference, 2002. Then followed by grouping by the identity of people present in the images using the method of clustering by facial similarity described in U.S. patent application Ser. No. 10/143,272, entitled "Method and Apparatus for Organizing and Retrieving Images Containing Human Faces" filed May 10, 2002 in the names of Chen et al, which is hereby incorporated herein by reference. Full identification of the individual in every image may not be required. For example, when the groups are subevents, it can reasonably be assumed that the identified individual is likely to be in multiple images of the group. In that case, once a face is recognized in a particular image of a group, faces in other images of the group can be recognized by the same procedure or a modified procedure, in which common characteristics, such as incomplete sets of facial feature points, clothing, and the like, are considered to indicate occurrences of the individual in multiple images.

The face metric used in clustering the images of a group can take a variety of forms. As with the other stages of the clustering of the groups, suitable metrics and thresholds for clustering can be determined heuristically by evaluation of groups of consumer images or other types of images. In a particular embodiment, the face metric is the calculated percentage of images in the collection that contain at least one face. If the percentage of images is above a predetermined threshold, the group is clustered in a person-oriented cluster. The threshold can be a user selected value or be preset at greater than 50 percent, indicating that a majority of the images contain faces.

The term "main subject" is used in a photographic sense to refer to one or more items in a captured scene that as a result of perspective are distinguishable from the remainder of the scene, referred to as the background. Perspective is inclusive of such factors as: linear perspective (convergence to a vanishing point), overlap, depth of field, lighting and color cues, and, in appropriate cases, motion perspective and motion parallax. The main subject can also be distinguishable from the background, in some cases, based upon range information, such as metadata indicating camera rangefinder data and the pixel-by-pixel range data provided in scannerless range imaging.

The presence of a main subject can be detected in a variety of ways, such as, using metadata providing or based on camera rangefinder data from the time of image capture and data provided by automatic zoom and crop procedures. In step 415, an automatic zoom and crop method is performed on each image in the subevent collection. U.S. Pat. No. 6,282,317, to J. Luo, S. Etz, and A. Singhal, entitled "Method for automatic determination of main subjects in photographic images," issued Aug. 28, 2001 and U.S. Pat. No. 7,062,085, to J. Luo and A. Singhal, entitled "Method for detecting subject matter regions in images," issued Jun. 13, 2006 disclose algorithms for automatically identifying the main subject of an image. U.S. Pat. No. 6,654,506, to J. Luo and R. Gray, entitled "Method for automatically creating cropped and zoomed versions of photographic images," issued Nov. 11, 2003, discloses an algorithm for zooming and cropping an image based on the main subject. The data provided by the zoom and crop procedure can take a variety of forms, such as a zoom factor or area of a cropped region, and can be used directly or after calculating another value, such as the percentage of the overall image that the cropped region represents. In a particular embodiment, an objective determination of the presence of a main subject is made. The percentage of the overall image that the cropped region represents is calculated for each image in the group. Using this percentage and a pair of predetermined thresholds, the presence of a main subject in the image is determined. The first threshold is the minimum cropped region size. If the cropped region percentage is less than the minimum threshold, the cropped region is not a main subject because it constitutes too small an area of the image. The second threshold is the maximum cropped region size. If the cropped region percentage is greater than the maximum threshold, the cropped region is not a main subject because it constitutes too large an area of the image. A cropped region that is too large or too small cannot be reliably discriminated from the background. In a particular embodiment, 0.80 (80%) has been found to be a good maximum threshold and 0.20 (20%) a good minimum threshold.

The main subject metric used in the clustering can take a variety of forms. In a particular embodiment, the percentage of images having main subjects is calculated. If this percentage is above a predetermined threshold, the group is clustered in a subject-oriented cluster. Examples of thresholds for this purpose include a user selected value or a threshold of greater than 50 percent.

In particular embodiments, a main subject is identified as a part of determining other measures, such as main subject colorfulness and main subject centrality can be calculated. Examples of procedures for calculating these values are disclosed in U.S. Pat. No. 6,282,317 to Luo et al. and U.S. Pat. No. 7,162,102 to N. Cahill, and L. Ray, entitled "METHOD AND SYSTEM FOR COMPOSITING IMAGES TO PRODUCE A CROPPED IMAGE", which is hereby incorporated herein by reference.

The presence of duplicate images is determined by locating, in a group, images that have the same or nearly the same content and composition and were captured from the same or almost the same angle and range. U.S. Pat. No. 6,351,556, to A. Loui, and E. Pavie, entitled "A METHOD FOR AUTOMATICALLY COMPARING CONTENT OF IMAGES FOR CLASSIFICATION INTO EVENTS", which is hereby incorporated herein by reference, describes a procedure for computing block-based color histograms of an image and comparing them to another image to determine a similarity match. In applying this procedure, a similarity match score can be computed for each pair of images within a group. Duplicate images exhibit a high similarity score. A threshold can be preset to determine if the images are duplicates, for example, at a similarity score of 90 percent calculated in accordance with U.S. Pat. No. 6,351,556.

Representative images for groups having one or more feature clusters are determined based on the primary saliency feature of the highest cluster. A general approach to this is to use a set of predetermined rules to make the determinations. The predetermined rules have the general feature that the most important saliency features, such as faces are used first, followed by other saliency features in order of importance. The importance of particular saliency features, in a particular use, can be determined heuristically, such as by consumer testing.

Figure 6:
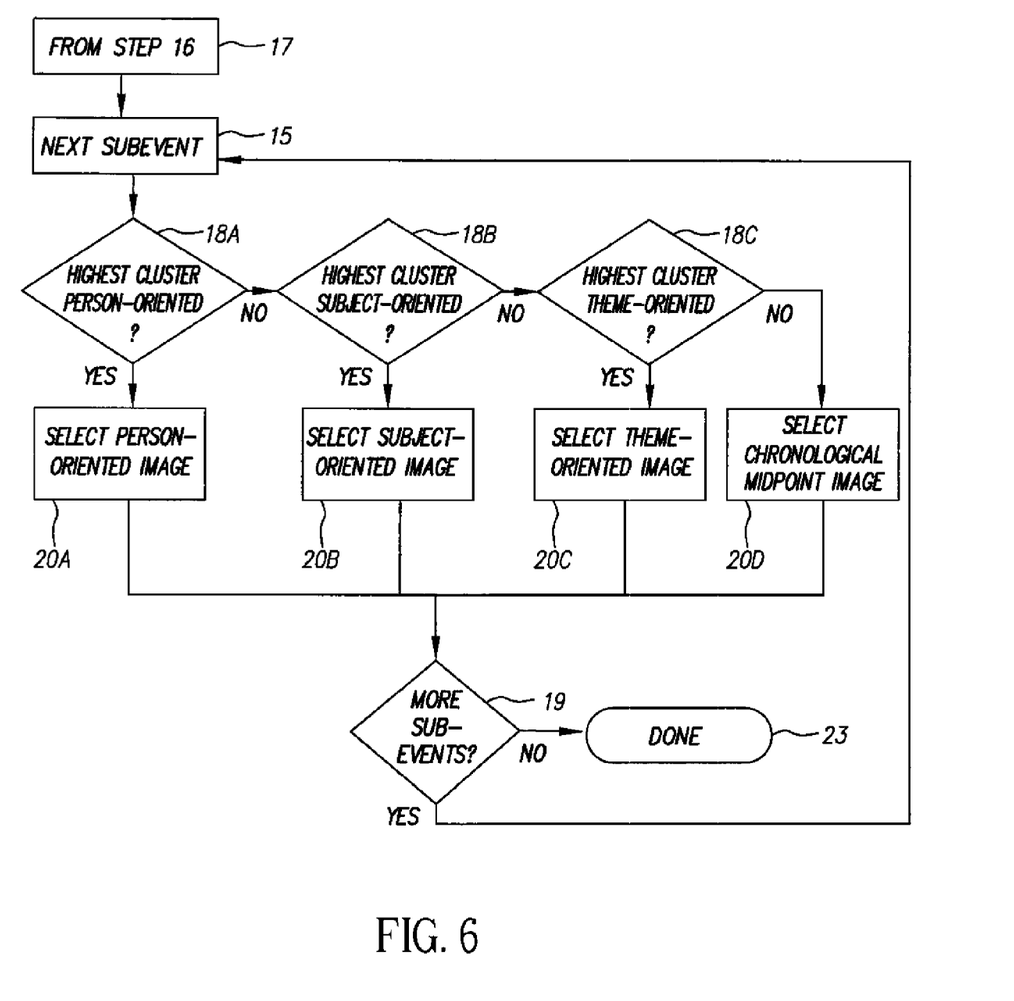
FIG. 6 is a detailed flow chart showing the ascertaining and designating steps in the method of FIG. 1.

Referring now to FIG. 6, in a particular embodiment, the representative image is determined based on the respective saliency feature of the highest cluster when the highest cluster is a feature cluster and independent of the saliency features when the highest cluster is the remainder cluster. In FIG. 6, the clustered subevents are received (17) from step (16) and then individually considered (15). FIG. 6 corresponds to an embodiment, in which the highest cluster is based on a saliency feature of the presence of one or more faces, the second highest cluster is based on a saliency feature of the presence of a main subject, the third highest cluster is based on a saliency feature of the presence of duplicate image records, and the fourth highest cluster is the remainder cluster. For convenience, the first three clusters are also referred to herein as being person-oriented, subject-oriented, and theme-oriented, respectively. Each hierarchically clustered subevent is reviewed to determine the highest cluster. FIG. 6 shows a cascade of determinations (18a), (18b), (18c) as to whether the highest cluster in the subevent is person-oriented, main subject-oriented, theme-oriented, or whether the highest cluster is the remainder cluster. This corresponds to the order of clustering shown in FIG. 5. It will be apparent to those of skill in the art that FIGS. 5 and 6 could be combined so as to loop through each subevent only once. In that case, determination (18a) follows clustering (16a), determination (18b) follows clustering (16b), determination (18c) follows clustering (16c), and selection (20d) is performed on remainder cluster 104.

In a particular embodiment, when the highest cluster in a group is from a clustering stage directed to the presence of faces, the representative image is determined by evaluating the facial area of the faces in each of the images of the highest cluster and selecting as the representative image, one of the images having a maximum facial area; or alternatively, the maximum facial area and image quality features, such as sharpness and contrast, meeting a predefined criterion. In another embodiment, when the highest cluster in a group is from a clustering stage directed to the presence of faces, the representative image is determined by recognizing one or more of the faces in the images of the highest cluster and selecting one of the recognized faces. Features of these embodiments could be combined to select a recognized face having a maximum facial area and image quality meeting a predefined criterion.

In a particular embodiment, when the highest cluster in a group is from a clustering stage directed to the presence of a main subject, the representative image is determined by computing relative sizes of the main subjects of the images of the highest cluster and selecting the representative image from one of the images having a main subject in a middle range of the relative sizes. The selection is based on a predetermined rule, such as the nearest image to a mean or median of the main subject sizes in the highest cluster. Alternatively, the selection can be based on the largest main subject size, which would produce the representative images suitable for small display environments, such as the displays used on cell phones. Another selection criterion can be the image quality of the main subject area.

In a particular embodiment, when the highest cluster in a group is from a clustering stage directed to the presence of duplicate images, the representative image is determined by identifying one or more sets of two or more duplicate images in the highest cluster and selecting the representative image from one of the duplicate images in the highest group. The selection is based on a predetermined rule, such as one of the duplicate images of the set having the greatest number of duplicate images. The selection of the duplicate image can also be based on image quality measures, such as sharpness and contrast meeting a predefined criterion.

In a particular embodiment, when the highest cluster in a group is the remainder cluster, the representative image is selected from one or more images at a spatio-temporal or chronological midpoint of the cluster. This approach avoids the risk that images from the beginning or end of an event may have content that is transitional in nature.

In a particular embodiment having events and subevents, a representative image of each of the events is selected from the representative images of the respective subevents. In a particular embodiment, the representative image of the events are selected by finding in each event, the respective subevent having the largest number of images and setting the representative image of that subevent as the representative image of the event. This approach has the advantage that it tends to select from the subevent of the greatest importance to the consumer based on the quantity of images captured at the event. In another embodiment, the representative image is selected from the subevent with images of the highest image quality. In yet another embodiment, the representative image is to selected from the subevent that contains the largest number of detected faces, or recognizable people (people that user knows).

Representative images, once determined, can be used as a flat index or summary or, in particular embodiments, can be presented in a hierarchical structure. For example, chapter icons for DVD's or other digital media. The representative images can be used with or without modification, such as image size modification or image quality enhancement. For example, in uses such as hand-held devices, in which the size of the display screen is small, the representative image can be cropped, in appropriate clusters, to the area of the image containing a face or main subject.

The invention has been described in detail with particular reference to certain preferred embodiments thereof, but it will be understood that variations and modifications can be effected within the spirit and scope of the invention.

The invention claimed is:

1. A computer-mediated method for providing representative images in a collection, the image records each including one or more captured digital images, the method comprising:
using a computer to provide the steps of:
classifying the image records spatio-temporally into groups wherein the classifying further comprises clustering the image records into events and then into subevents, wherein the groups are the subevents;
partitioning the image records of each of the groups into a set of clusters, the partitioning being between a hierarchy of three feature clusters and a remainder cluster and being based on a predetermined plurality of saliency features, the feature clusters each having one of the saliency features, and the remainder cluster lacking the saliency features, the clustering further comprises, in order the steps of:
(a) clustering the image records of each of the subevents between a first feature cluster and a first non-feature cluster based on a face metric;
(b) when the first non-feature cluster includes one or more of the image records, clustering respective image records of the first non-feature cluster between a second feature cluster and a second non-feature cluster based on a main subject metric;
(c) when the second non-feature cluster includes one or more of the image records, clustering respective image records of the second non-feature cluster between a third feature cluster and a remainder cluster based on a duplicate image records metric;
ascertaining a hierarchically highest cluster in each of the sets to provide the highest clusters; and
designating a representative image of each of the groups from the respective image records, the designating being based on the respective saliency feature of the highest cluster when the highest cluster is a feature cluster and independent of the saliency features when the highest cluster is the remainder cluster.

2. The method of claim 1 wherein when said highest cluster on one of said groups is said remainder cluster, said designating is from one or more respective image records at a spatio-temporal midpoint of said cluster.

3. The method of claim 1 wherein said metrics are of the saliency features: presence of one or more faces, presence of a main subject, and presence of duplicate image records, respectively, and said clustering steps each further comprise determining whether the respective said metric exceeds a respective predetermined threshold.

4. The method of claim 3 wherein, when said highest cluster is said first said feature cluster, said designating further comprises:
evaluating facial area of said faces in each of said image records of said highest cluster; and
selecting said representative image from one of said image records having a maximum facial area.

5. The method of claim 4 wherein, when said highest cluster is said first said feature cluster, said designating further comprises:
recognizing one or more of said faces in said image records of said highest cluster; and
selecting said representative image from one of said image records having one or more of said recognized faces.

6. The method of claim 5 wherein, when said highest cluster is said second said feature cluster, said designating further comprises:
 determining relative sizes of said main subjects of respective said image records of said highest cluster; and
 selecting said representative image from one of said image records having said main subject in a middle range of said relative sizes.

7. The method of claim 6 wherein said selecting steps each further comprise considering image quality of respective said image records.

8. The method of claim 6 wherein, when said highest cluster is said third said feature cluster, said designating further comprises:
 identifying one or more sets of two or more duplicate image records in said highest cluster; and
 selecting said representative image from one of said duplicate images.

9. The method of claim 8 wherein said one of said duplicate images is one of the images of the respective said set having a greatest number of said duplicate images in the respective said subevent.

10. The method of claim 8 wherein, when said highest cluster is said remainder cluster, said designating further comprises:
 determining one or more of said image records at a spatio-temporal midpoint of said highest cluster; and
 selecting said image record from said one or more image records at said spatio-temporal midpoint as said representative image of said remaining group.

* * * * *